Patented Nov. 25, 1947

2,431,309

UNITED STATES PATENT OFFICE 2,431,309

METHOD OF RECOVERING DEXTRINS FROM STILLAGE SYRUP

Harold W. Coles, Rochester, N. Y., assignor to Joseph E. Seagram & Sons, Inc., Shively, Ky., a corporation of Indiana No Drawing. Application July 27, 1944, Serial No. 546,940

5 Claims. (Cl. 127—34)

This invention relates to the recovery of dextrin from thin distillery slop or thin stillage.

The principal object of the invention is to provide a novel process for recovering dextrins of superior quality to that heretofore recovered from stillage.

In carrying out the invention the thin stillage, which is inherently acidic, is concentrated and clarified; its pH adjusted to the alkaline side to precipitate impurities; the adjusted syrup centrifuged to separate the precipitated impurities from the syrup; the syrup treated with sufficient hydrochloric acid to render it slightly acidic; and the acidified syrup initially treated with alcohol to precipitate the ash and subsequently treated with more alcohol to precipitate the dextrin while placing some of the remaining impurities in solution.

The clarified syrup may be produced from thin stillage in any of a number of ways. For example, the thin stillage may be evaporated to a syrup and then clarified by dialyzing it through a membrane as disclosed in my co-pending application, Serial No. 546,939, filed July 27, 1944.

Preferably, however, the stillage is evaporated to a degree where it is just about to enter the syrup stage, clarified at this point centrifugally and then evaporated to a syrup. This may be accomplished in a triple or four effect evaporator wherein the stillage at the end of the first or second effect is centrifuged and then passed thru the remaining effects. This latter procedure appears to produce a better quality of syrup for dextrin recovery purposes than is otherwise produced.

The pH of the clarified syrup is now adjusted to the alkaline side for the purpose of removing additional impurities by precipitation. The precipitate formed upon this adjustment is quite complex chemically. It is entirely made up of non-tacky substances and contains protein elements. An adjustment to a pH value of 9 is preferred since it appears to be the iso-electric point for numerous nitrogen containing substances in the evaporated syrup, as is indicated by the fact that, as a result of such adjustment, the nitrogen assay of the resulting dextrin is greatly reduced. Various materials may be used as alkaline precipitants but ammonium hydroxide is preferred. Sodium and potassium hydroxide may be employed but, since they increase the ash forming element Na, they should not be used unless the material thereafter is dialyzed through a membrane. Urea may also be used as a precipitant.

The alkaline precipitate is preferably removed centrifugally from the alkaline syrup since it is somewhat difficult to filter.

The alkaline syrup or "filtrate" is now rendered slightly acidic by the addition of hydrochloric acid to a pH, for example, of about 6.0 to 6.5. The acidic syrup may then be treated with alcohol, in an amount equal to 70% by volume of the moisture content of the syrup in order to precipitate the dextrin while placing other impurities in solution. However, after acidifying the alkaline "filtrate" with hydrochloric acid to a point where it is slightly acidic in reaction (pH 6.0–6.5 for example) and before it is mixed with 70% alcohol by volume, I prefer to mix it with an amount of alcohol equal, in volume, to 50% of the moisture content of the syrup.

I have found that when alcohol, approximating 50%, is employed, a precipitate is formed containing a small amount of dextrin and a large amount of ash. As a consequence, this precipitate can be removed and wasted with but little loss. Upon its removal, the alcohol content of the syrup can be raised to 70%, or even 80%, to form a precipitate of unusually low ash content while placing the other impurities in solution.

The alcohol volume must not vary greatly from 50% to produce a large ash precipitate economically. As the alcohol volume progressively exceeds 50%, the amount of dextrin precipitated progressively increases at a much more rapid rate than that at which the ash precipitate increases. On the other hand, as the alcohol volume progressively decreases below 50%, the amount of ash precipitated rapidly falls off and soon reaches a value too small to render the use of that lowered quantity of alcohol worthwhile.

In accordance, therefore, with a particular feature of this invention the acidified syrup is first treated with approximately 50% alcohol, by volume, to precipitate much of the ash, and, upon removing that precipitate by filtration, the alcohol content is increased to a minimum value approximating 70% to precipitate the dextrin. Upon removal of the dextrin precipitate, it may be either treated, one or more times, with a volume of alcohol approximating 70% or more of its moisture content to reprecipitate a purer form of dextrin, or it may be dissolved in distilled water and then reprecipitated with 70% alcohol by volume. In each case additional impurities go into solution and the precipitate is recovered by filtration. Normally only one such additional treatment will be found desirable.

Having described my invention, I claim:

1. A method of recovering dextrin from stillage syrup comprising: adjusting the pH of the syrup sufficiently on the alkaline side to precipitate impurities; separating the precipitate from the alkaline syrup; thereafter adjusting the pH of the alkaline syrup to render it slightly acidic with a pH value not substantially below 6:0; and treating the acidic syrup with alcohol to separate impurities from its dextrin content, the volume of alcohol approximating 50% to 80% of the moisture content of the acidic syrup.

2. The method of claim 1, wherein the alkaline adjustment is made to a pH value approximating 9.0.

3. The method of claim 1, wherein the acidic syrup is treated with alcohol by mixing in an amount of alcohol approximating 50% by volume of the moisture content of the syrup to precipitate impurities, removing the precipitate, increasing the alcohol content of the syrup until its volume is not less than approximately 70% of the moisture content of the syrup so as to precipitate the dextrin while placing impurities in solution, and thereafter removing the dextrin precipitate.

4. A method of recovering dextrin from stillage syrup comprising: adjusting the syrup to a pH value approximating 9.0 to precipitate impurities; separating the alkaline precipitate from the alkaline syrup; thereafter adjusting the pH of the alkaline syrup to render it slightly acidic with a pH value not substantially below 6.0; mixing with the acidic syrup an amount of alcohol, approximating 50% by volume of the moisture content of the syrup, to precipitate impurities; separating the acidic precipitate from the syrup; thereafter increasing the alcohol content of the acidic syrup, to a value approximating 70% by volume of the moisture content of the syrup, to precipitate dextrin; and separating the dextrin precipitate.

5. The method of claim 4 wherein the pH of the alkaline syrup is adjusted to an acidic value approximating 6.0 to 6.5.

HAROLD W. COLES.